United States Patent [19]

Fujita et al.

[11] 4,188,800

[45] Feb. 19, 1980

[54] DRIVE SHAFT OF FAN COUPLING ASSEMBLY FOR MOTOR VEHICLES

[75] Inventors: Saburo Fujita; Hiroaki Toyoda, both of Anjo; Junichi Ito, Handa; Masaharu Hayashi, Toyota, all of Japan

[73] Assignee: Aisin Seiki Kabushiki Kaisha, Aichi Pref., Japan

[21] Appl. No.: 804,346

[22] Filed: Jun. 7, 1977

[30] Foreign Application Priority Data

Jun. 10, 1976 [JP] Japan ................................. 51-75462

[51] Int. Cl.² .......................... F16C 1/06; F16C 1/26; F16G 11/00
[52] U.S. Cl. ........................................ 64/4; 403/274; 403/282; 403/284
[58] Field of Search ....................... 403/274, 282, 284; 64/4

[56] References Cited

U.S. PATENT DOCUMENTS

| 2,797,562 | 7/1957 | Forgash | 403/284 |
| 3,132,237 | 5/1964 | Pribonic | 403/274 |
| 3,232,650 | 1/1966 | Ross | 403/274 |
| 3,299,504 | 1/1967 | Hopp | 403/274 |
| 3,332,141 | 7/1967 | Hopp | 403/274 |
| 3,461,545 | 8/1969 | Bush | 403/274 |
| 4,110,051 | 8/1978 | Mettler | 403/274 |
| 4,118,134 | 10/1978 | Mansel | 403/282 |

Primary Examiner—Charles J. Myhre
Assistant Examiner—R. C. Turner
Attorney, Agent, or Firm—Oblon, Fisher, Spivak, McClelland & Maier

[57] ABSTRACT

A drive shaft of a fan coupling assembly includes a shaft member fixedly connected with a fan drive rotor, and a flange member fixedly connected with a fan pulley. The two members are separately formed into their predetermined configurations. The shaft member has a securing portion and a flange coaxially formed at one end thereof, while the flange member has a central bore including a plurality of radially outwardly recessed portions. After the flange member is fitted on the shaft member through the central bore thereof, the two members are fixedly secured to each other by a securing member, whereby an integral flanged shaft may be obtained.

2 Claims, 5 Drawing Figures

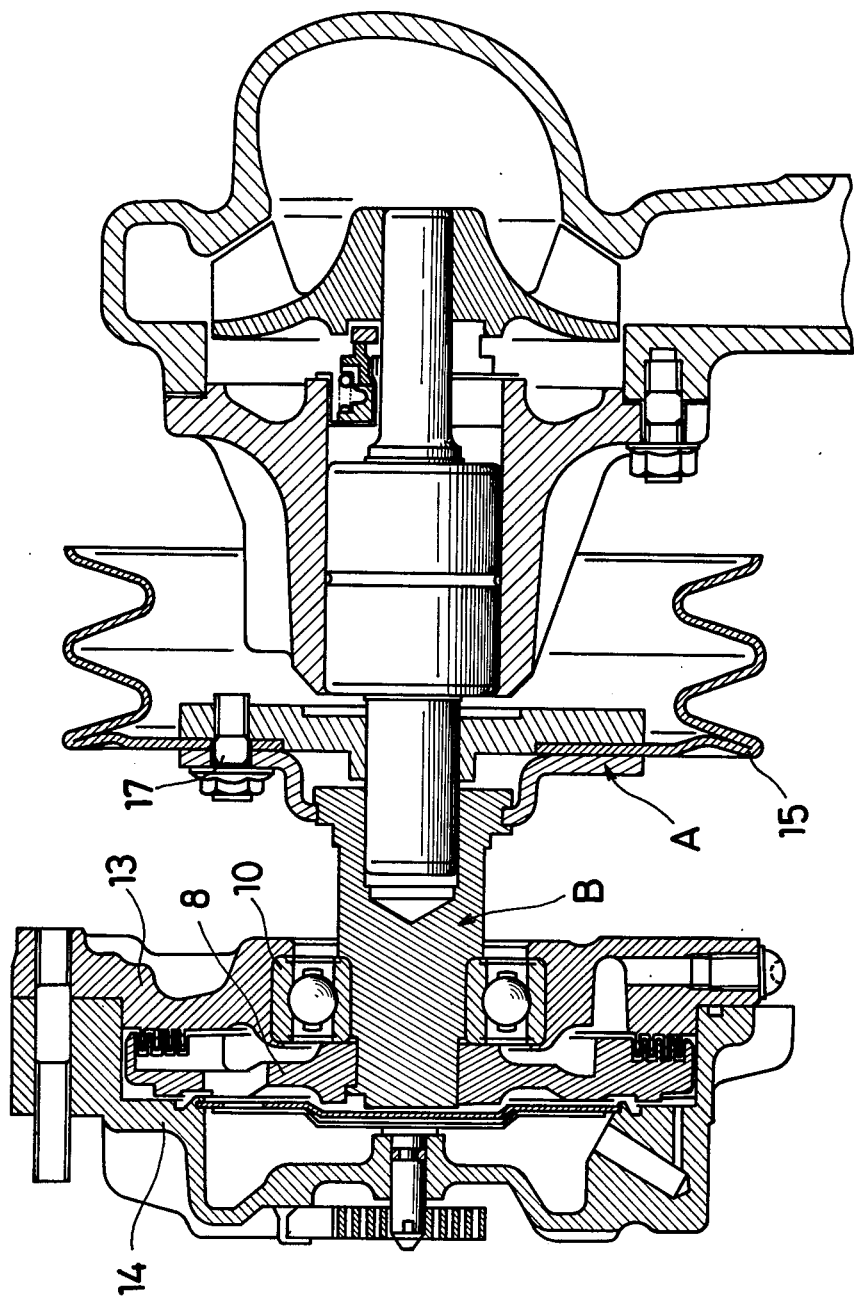

DRIVE SHAFT OF FAN COUPLING ASSEMBLY FOR MOTOR VEHICLES

BACKGROUND OF THE INVENTION

1. Field of the Invention

This invention relates generally to a drive shaft of a fan coupling assembly, and more particularly to the means of attachment to the fan drive pulley.

2. Description of the Prior Art

Conventionally, the drive shaft of a fan coupling assembly includes a shaft member upon which a drive rotor of the coupling assembly is fixedly secured, and a flange member for attaching the fan drive pulley thereon. The two members are formed in one piece from a metal rod by cold forging. The metal rod has substantially the same diameter as that of the shaft member. In the conventional method, the diameter of the flange member is required to be three times larger than that of the shaft member, and the thickness of the flange is required to be thicker than is necessary, in order to effectively connect the fan drive pulley therewith. Consequently, the forging process particularly for forming the flange member is so complicated that reduction of the production efficiency has not been avoided, which leads to a high cost of the products.

In addition, if the increase in the drive torque is desired, it is necessary to increase the diameter of the flange member. Due to the problem of the present forging technique in this field, however, it is very difficult to achieve such an increase in diameter.

SUMMARY OF THE INVENTION

It is, therefore, an object of the present invention to provide an improved fan drive shaft which obviates the above-noted conventional drawbacks.

According to the present invention, the fan drive shaft includes a shaft member which is connected with a fan drive rotor and a fan housing, and a flange member which is connected with a fan pulley. The two members are combined by securing means after they have been formed into their predetermined configurations. The shaft member is formed from a metal rod by cutting, while the flange member is formed from a rolled steel plate by pressing.

BRIEF DESCRIPTION OF THE DRAWINGS

Various other objects, features and attendant advantages of the present invention will be fully appreciated as the same becomes better understood from the following detailed description when considered in connection with the accompanying drawings in which like reference characters designate like or corresponding parts throughout the several views, and wherein:

FIG. 5 shows a sectional plan view of the fan drive shaft showing the fan coupling assembly with the fan drive pulley being connected thereto.

DETAILED DESCRIPTION OF THE PREFERRED EMBODIMENTS

Figure 2:
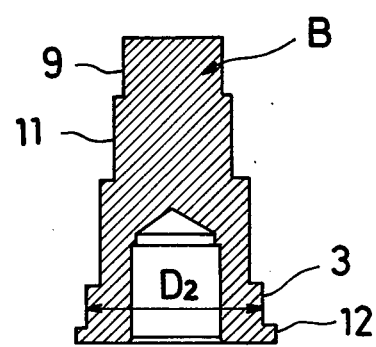
FIG. 2 shows a sectional plan view of a shaft member of the fan drive shaft according to the present invention.
Figure 3:
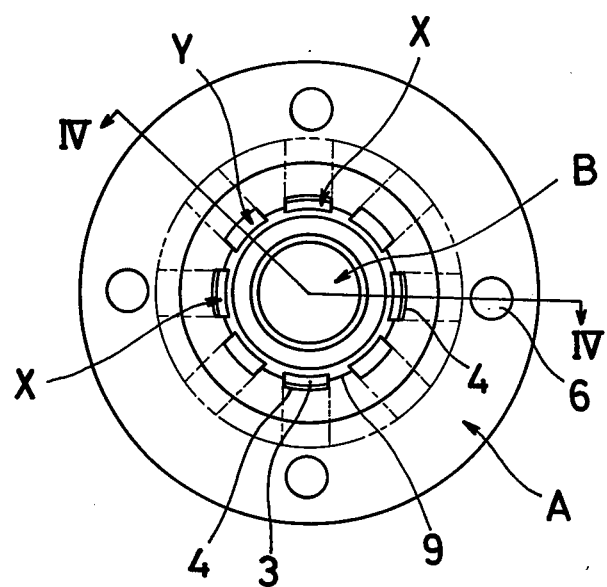
FIG. 3 shows a front plan view of the assembled fan drive shaft.
Figure 4:
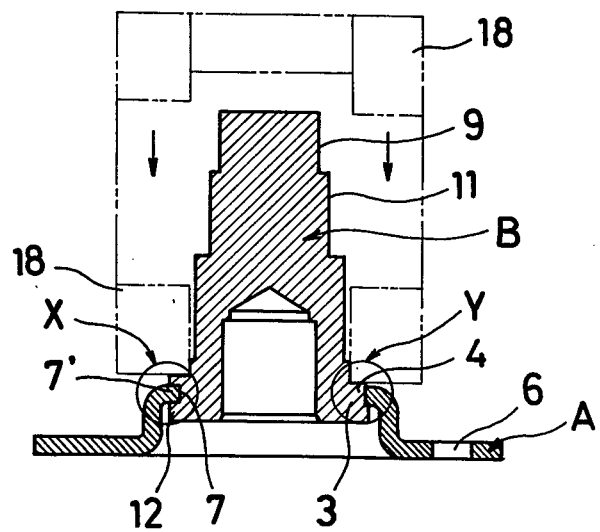
FIG. 4 is a sectional plan view taken along the line IV—IV of FIG. 3.

The main feature of the present invention resides in that a flange member A (FIG. 1) and a shaft member B (FIG. 2) are separately formed and the thus formed members are secured to each other for obtaining an integral flanged shaft (FIGS. 3 and 4).

The shaft member B, shown in FIG. 2, is formed first from a metal rod material by cold forging, and then the thus forged material is successively provided with a rotor securing area 9, a bearing assembly attaching area 11, a securing portion 3 for securing the flange member A, and a flange 12 coaxially formed at one end thereof for supporting the attached flange member A thereon. These stepped portions are formed by a cutting procedure. The fan drive rotor 8 and the bearing assembly 10 are shown in FIG. 5 in the attached condition. The coupling housing includes a case portion 13 and a cover portion 14 secured to each other.

Figure 1:
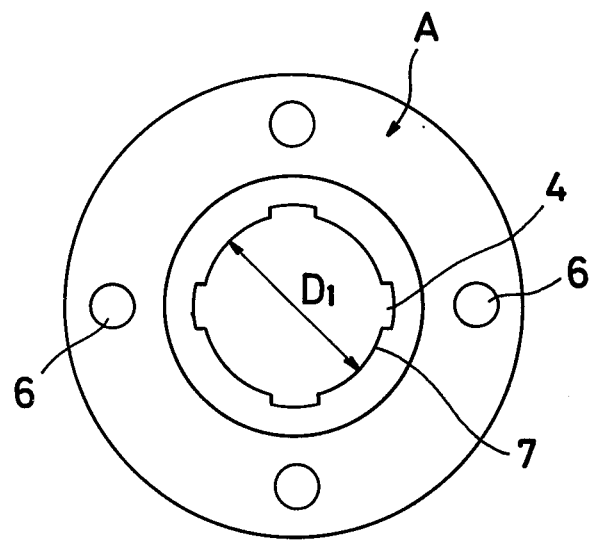
FIG. 1 shows a front plan view of a flange member of the fan drive shaft according to the present invention.

The flange member A, shown in FIG. 1, is formed from a rolled metal sheet by pressing. The flange portion A has at the outer portion thereof a plurality of holes 6 for receiving therein corresponding bolts for attachment to pulley 15, and at the inner portion thereof a central bore 7 having a diameter $D_1$ somewhat larger than the diameter $D_2$ of the securing portion 3 of the flange member B (FIG. 2). The central bore 7 includes a plurality of radially outwardly recessed portions 4 for receiving parts of the securing portion 3 by the securing procedure in order to assure the connection therebetween.

Referring now to the securing procedure between the two members A and B, the flange member A is first fitted on the shaft member B fixed on a stable stand, and the outer side 7' of the central bore 7 is placed in contact with the inner side of the flange 12. In this state, the securing portion 3 of the shaft member B is pressed from above, as shown in FIG. 4, by securing means 18. Consequently, the outer portion of the central bore 7 of the flange member A is divided into two parts, one of which is the part X held by the flange 12 of the shaft member B, the other of which is the part Y secured by pressing the securing portion 3 of the shaft member B into the recessed portions 4 of the flange member A without making a clearance or gap in the inner part of the recessed portions 4. Thus, the flange member A and the shaft member B are fixedly secured to each other. The two members A and B are prevented from moving axially by the part X, and moving in the rotational direction by the part Y. Accordingly, there is no functional difference between the drive shaft of the present invention and that of the conventional drive shaft. The parts X and Y are formed at four positions each on the circumference. The member of the securing parts X and Y could be more than four depending upon the necessary strength to be determined.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A drive shaft of a fan coupling assembly which comprises:

a shaft member fixedly connected with a fan drive rotor, and a flange member fixedly connected with a fan pulley, said shaft and said flange member being separately formed and being secured to each other so as to form an integral flange shaft, said integral flange shaft including first means preventing said two members from moving axially, respectively, and second means preventing said two members from moving in a rotational direction, respectively, wherein said integral flange shaft is provided with a securing portion for securing said flange member, and a flange portion coaxially formed at one end thereof for supporting said flange member thereon and said flange member having a central bore including a plurality of radially outwardly recessed portions and wherein said first means includes a portion of said integral flanged shaft fixedly enclosing said flange portion along the outer periphery of said central bore, said second means including a portion of said integral flanged shaft disposed within said recessed portions without forming a gap therebetween.

2. A drive shaft of a fan coupling assembly which comprises:

a shaft member fixedly connected with a fan drive rotor, and a flange member fixedly connected with a fan pulley, said shaft and said flange member being separately formed and being secured to each other so as to form an integral flanged shaft, said integral flanged shaft including radially spaced first means preventing said two members from moving axially, respectively, and radially spaced second means alternately disposed between said first means for preventing said two members from moving in a rotational direction, respectively, wherein said integral flanged shaft is provided with a securing portion for securing said flange member, and a flange portion coaxially formed at one end thereof for supporting said flanged member thereon and wherein said flange member has a central bore including a plurality of radially outwardly recessed portions.

* * * * *